United States Patent
Abedin et al.

(10) Patent No.: US 11,175,232 B2
(45) Date of Patent: Nov. 16, 2021

(54) STANDOFF ULTRA-COMPACT MICRO-RAMAN SENSOR

(71) Applicant: UNITED STATES OF AMERICA AS REPRESENTED BY THE ADMINISTRATOR OF NASA, Washington, DC (US)

(72) Inventors: M. Nural Abedin, Yorktown, VA (US); Arthur T. Bradley, Yorktown, VA (US); Anupam Kumar Misra, Honolulu, HI (US); Yingxin Bai, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 0 days.

(21) Appl. No.: 16/225,786

(22) Filed: Dec. 19, 2018

(65) Prior Publication Data
US 2019/0219510 A1    Jul. 18, 2019

Related U.S. Application Data

(60) Provisional application No. 62/617,684, filed on Jan. 16, 2018.

(51) Int. Cl.
*G01N 21/65* (2006.01)
*G01N 21/64* (2006.01)

(52) U.S. Cl.
CPC ......... *G01N 21/65* (2013.01); *G01N 21/6402* (2013.01); *G01N 21/6458* (2013.01); *G01N 2201/0221* (2013.01)

(58) Field of Classification Search
CPC .............. G01N 21/65; G01N 21/6402; G01N 21/6458; G01N 2201/0221;
(Continued)

(56) References Cited

U.S. PATENT DOCUMENTS 4,787,740 A * 11/1988 Inoue ................ G01N 21/65
356/301
5,257,085 A * 10/1993 Ulich ................ G01J 3/2823
348/31

(Continued)

*Primary Examiner* — Mohamed K Amara
(74) *Attorney, Agent, or Firm* — Shawn P. Gorman; Jonathan B. Soike; Helen M. Galus (57) ABSTRACT

Standoff ultra-compact micro-Raman sensors configured to receive Raman scattering from a substance are disclosed. A laser device may be configured to transmit a laser at a first wavelength. The laser may be expanded to a predetermined size, focused through a lens, and made incident on an unknown substance. A filter may reflect the laser and Rayleigh scattering from the substance, but may permit Raman scattering and laser-induced fluorescence from the substance. One or more lenses and/or filters may receive and pass the Raman scattering and/or laser-induced fluorescence to a light sensor. The received Raman scattering and/or laser-induced fluorescence may be compared to known fingerprints of substances to determine an identity of the substance. The wavelength of the laser, the width of the laser, and other parameters may be varied based on the distance between the standoff ultra-compact micro-Raman sensor and the substance.

20 Claims, 3 Drawing Sheets

(58) Field of Classification Search
CPC ....... G01N 21/6456; G01N 2021/4709; G01N 2021/6463; G01N 2021/655; G01N 21/64; G01S 17/02; G01S 17/86; G01J 3/2823; G01J 3/44; G01J 3/0205; G01J 3/0208; G01J 3/0294; G01J 3/4406; F41H 11/12; G01V 8/02

See application file for complete search history.

(56) References Cited

U.S. PATENT DOCUMENTS

| | | | | |
|---|---|---|---|---|
| 6,978,062 B2* | 12/2005 | Rose | | G02B 6/29311 385/15 |
| 7,391,509 B1* | 6/2008 | Deck | | G02B 21/16 356/301 |
| 8,072,595 B1* | 12/2011 | Bastiaans | | G01N 21/65 356/301 |
| 8,575,570 B2* | 11/2013 | Choi | | G01N 21/4795 250/459.1 |
| 8,976,351 B2* | 3/2015 | Bivolaru | | G01N 21/72 356/337 |
| 9,658,162 B2* | 5/2017 | Wickramasinghe | | G01J 3/453 |
| 10,139,345 B2* | 11/2018 | Wincheski | | G01N 21/65 |
| 10,234,559 B2* | 3/2019 | Misra | | G01J 3/4406 |
| 10,281,398 B2* | 5/2019 | Zheng | | G01N 21/553 |
| 2002/0133065 A1* | 9/2002 | Lucassen | | A61B 5/6824 600/322 |
| 2003/0067645 A1* | 4/2003 | Ibsen | | G02B 6/272 398/79 |
| 2004/0042006 A1* | 3/2004 | Chen | | G01J 3/44 356/301 |
| 2004/0114219 A1* | 6/2004 | Richardson | | G01N 21/6458 359/368 |
| 2004/0218184 A1* | 11/2004 | Jorgenson | | B82Y 15/00 356/419 |
| 2005/0248758 A1* | 11/2005 | Carron | | G01N 21/65 356/301 |
| 2006/0152719 A1* | 7/2006 | Iuliano | | G01N 21/658 356/301 |
| 2006/0226374 A1* | 10/2006 | Rigler | | G01N 21/6458 250/458.1 |
| 2007/0035624 A1* | 2/2007 | Lubard | | G01S 17/89 348/144 |
| 2007/0216898 A1* | 9/2007 | Gardner, Jr. | | G01J 3/44 356/301 |
| 2008/0088837 A1* | 4/2008 | Gardner, Jr. | | G01J 3/28 356/301 |
| 2009/0152475 A1* | 6/2009 | Sasaki | | G01J 3/10 250/492.1 |
| 2009/0189074 A1* | 7/2009 | Bello | | G01J 3/447 250/301 |
| 2010/0020318 A1* | 1/2010 | Lee | | G01J 3/4412 356/301 |
| 2010/0044586 A1* | 2/2010 | Duhr | | G01N 21/6428 250/459.1 |
| 2010/0072367 A1* | 3/2010 | Meurer | | F41H 11/12 250/337 |
| 2010/0179435 A1* | 7/2010 | Sharifzadeh | | A61B 5/1455 600/476 |
| 2011/0206291 A1* | 8/2011 | Kashani | | A61B 5/14555 382/255 |
| 2011/0292376 A1* | 12/2011 | Kukushkin | | G01J 1/58 356/73 |
| 2012/0092663 A1* | 4/2012 | Kull | | G01N 21/65 356/301 |
| 2012/0145925 A1* | 6/2012 | Comstock | | G01N 21/6402 250/459.1 |
| 2013/0188181 A1* | 7/2013 | Angel | | G01N 21/65 356/301 |
| 2013/0248128 A1* | 9/2013 | Rector | | D21C 3/222 162/76 |
| 2013/0342835 A1* | 12/2013 | Blacksberg | | G01J 3/2889 356/301 |
| 2014/0029003 A1* | 1/2014 | Shih | | G01J 3/0229 356/301 |
| 2014/0192355 A1* | 7/2014 | Froigneux | | G02B 27/286 356/301 |
| 2014/0193839 A1* | 7/2014 | Cunningham | | G01J 3/0264 435/7.92 |
| 2015/0049326 A1* | 2/2015 | Lundquist | | G01S 17/89 356/5.01 |
| 2015/0056645 A1* | 2/2015 | Vacca | | G01N 15/1434 435/29 |
| 2015/0204789 A1* | 7/2015 | Akkus | | G01J 3/44 702/196 |
| 2015/0204810 A1* | 7/2015 | Pan | | G01N 21/648 205/775 |
| 2016/0033328 A1* | 2/2016 | Walters | | G01J 3/0208 356/327 |
| 2016/0077009 A1* | 3/2016 | Gargas | | G01N 21/9501 356/301 |
| 2016/0146722 A1* | 5/2016 | Koerner | | G01B 9/02091 356/301 |
| 2016/0178439 A1* | 6/2016 | Freudiger | | G01N 15/1434 356/301 |
| 2016/0341668 A1* | 11/2016 | Gupta | | G01J 3/44 |
| 2017/0045722 A1* | 2/2017 | Fretel | | G01N 21/65 |
| 2017/0176338 A1* | 6/2017 | Wu | | G02F 1/29 |
| 2017/0184453 A1* | 6/2017 | Wang | | G01J 3/36 |
| 2017/0271837 A1* | 9/2017 | Hemenway | | H01S 3/06754 |
| 2017/0276919 A1* | 9/2017 | Frankel | | G01N 21/6458 |
| 2018/0136043 A1* | 5/2018 | Arnold | | G01J 3/0221 |
| 2019/0195805 A1* | 6/2019 | Zheng | | G01N 21/01 |

* cited by examiner

STANDOFF ULTRA-COMPACT MICRO-RAMAN SENSOR

CROSS-REFERENCE TO RELATED PATENT APPLICATION(S)

This patent application claims the benefit of and priority to 62/617,684, filed on Jan. 16, 2018, the contents of which are hereby incorporated by reference in their entirety.

STATEMENT REGARDING FEDERALLY SPONSORED RESEARCH OR DEVELOPMENT

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

OVERVIEW

Determining the identity of a substance, such as a mineral, can be difficult, particularly when the substance cannot be readily retrieved and analyzed. For example, during space explorations, a crew may desire to identify a substance on a planetary surface, but the substance may be too difficult to retrieve and test, let alone bring back to Earth for more rigorous testing. Moreover, some tests which may be used to identify a substance (e.g., tests requiring combustion) may be difficult to perform outside of a laboratory and/or the environment of the Earth.

One way to identify substances is Raman spectroscopy. Raman spectroscopy involves shining light (e.g., from a laser) at a particular wavelength at a substance. While the vast majority of scattering from the substance as a result of the light does so at the same wavelength as the light (a phenomenon referred to as Rayleigh scattering), a fraction of light (referred to as Raman scattering) is scattered at a higher or lower wavelength than the light. This higher or lower wavelength results from energy transfer between the light and the substance. Analysis of the wavelength of the Raman scattering provides information about the molecular vibrations, photons, excitation, and/or other energy information about the substance, which may be analyzed to determine the identity of the substance.

Raman spectroscopy generally requires that a substance be manually collected and shielded from ambient radiation. Take, for example, a lunar rover with a Raman spectroscopy device on the surface of the Moon. An operator of the rover may desire to determine the identity of an unknown substance found on the Moon. The Raman spectroscopy device may be configured to shine a laser at the substance at 500 nm and measure Raman scattering from the substance. Even if the measuring device of the Raman spectroscopy device were configured to filter out light at wavelengths corresponding to the laser (e.g., 500 nm), ambient radiation (e.g., light from the sun) may comprise a multitude of wavelengths which make identification and measurement of Rayleigh scattering extremely difficult. To avoid such ambient radiation, the lunar rover may be required to shield the substance from other forms of radiation, e.g., using a cover. In some instances, e.g., where a substance's Raman scattering is particularly similar to ambient radiation, the substance may require collection (e.g., inside of a container) and/or transportation to a dark room for later analysis. Such collection and/or transportation may be particularly difficult where, for example, the substance is too hard, heavy, or fragile to be readily collected and/or transported, too large or unwieldy to be properly covered, and/or where frequent measurements may be made such that collection and storage may place undue mechanical stresses on collection devices.

Raman spectroscopy is conventionally performed using light of a continuous waveform, which may impede the accuracy of measurements. For example, a particular form of biofluorescence may be short-lived, whereas a particular form of mineral luminescence may be long-lived. Use of a continuous wave laser, for example, prevents ready distinction between biofluorescence and luminescence, particularly in the presence of already-distracting ambient radiation.

SUMMARY

Aspects of the present disclosure include a stand-off ultra-compact Raman sensor and methods related thereto. In accordance with one or more embodiments, a laser device may transmit a laser at a particular wavelength, which may be reflected and filtered to strike a surface of an unknown substance. Rayleigh scattering, Raman scattering, and laser-induced fluorescence from the substance may result. The Rayleigh scattering may be filtered out, and/or the Raman scattering and laser-induced fluorescence may be filtered, diffused, and/or reflected to one or more sensors. A light sensor may analyze the spectrum of received light and determine whether the received light matches a fingerprint of known substances.

In one aspect, the stand-off ultra-compact Raman sensor is configured to operate without requiring the substance to be shielded from ambient radiation and/or requiring direct physical contact or movement of the substance. Use of a beam expander, one or more lenses, one or more filters, and/or by varying properties of the laser, the stand-off ultra-compact Raman sensor may isolate Raman scattering from the substance. In one or more embodiments, the stand-off ultra-compact Raman sensor may be reconfigured based on, for example, the distance between the stand-off ultra-compact Raman sensor and the substance. For example, the size of the laser may be controlled by a beam expander, such that one or more portions of the substance are exposed to the laser, and one or more second portions of the substance are not exposed to the laser. Similarly, the stand-off ultra-compact Raman sensor may also vary, e.g., the wavelength of the laser based on a prediction of the identity of the substance. One or more of the changes or alterations to the system or device may be automatically performed based on a processor processing computer-executable instructions on a computer-executable medium. As such, the system or device may operate in a more efficient manner than known systems or methods.

These and other features, advantages, and objects of the present invention will be further understood and appreciated by those skilled in the art by reference to the following specification, claims, and appended drawings.

DETAILED DESCRIPTION

Figure 1:
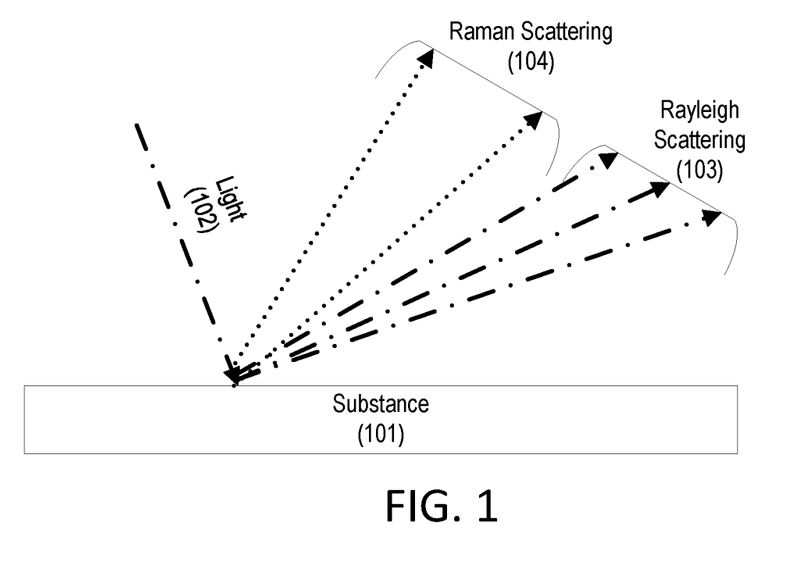
FIG. 1 shows Rayleigh and Raman scattering from a substance.

For purposes of description herein, the terms "upper," "lower," "right," "left," "rear," "front," "vertical," "horizontal," and derivatives thereof shall relate to the orientation shown in FIG. 1. However, it is to be understood that embodiments may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows Rayleigh scattering and Raman scattering from a substance. A light 102 of a certain particular wavelength strikes a substance 101. Though light is referenced throughout this application for illustrative purposes, the light may be more particularly photons, e.g., as arranged in a laser, and as such the term light and photons may be used interchangeably. Throughout this disclosure, the terms "strikes," "shines," "impinges on," "is incident upon," may be used to refer to light touching a substance; however, no distinction between these terms is intended, nor is any particular angle of incidence required. Further, certain embodiments are discussed in relation to the lack of physical contact or manipulation of the substrate/substance. A person of ordinary skill in the art will appreciate that this would still permit the striking of photons from the light source, which are not intended to move or otherwise disturb the substrate on a large scale. The light 102 may be, for example, a concentrated form of light such as a laser beam. As a result of the light striking the substance, Rayleigh scattering 103 of photons and Raman scattering 104 of photons result. As shown in FIG. 1 and represented by the dotted-and-dashed line, the wavelength of the light 102 and the Rayleigh scattering 103 are approximately the same. In contrast, as depicted by the dotted line corresponding to the Raman scattering 104, the Raman scattering 104 has a different wavelength as compared to the light 102 and/or the Rayleigh scattering 103. For example, the Raman scattering 104 may have a higher and/or lower wavelength and/or be weaker than the Rayleigh scattering 103.

The Raman scattering 104 results from the molecular vibrations, phonons, and/or other excitations and/or energy states of the substance 101. The substance 101 may comprise molecules at, e.g., different energy states. As photons of the light 102 hit the molecules in the substance, the energy state of the molecules may change (e.g., the molecule may gain or lose energy from the photons of the light 102). Because the total energy remains the same, the scattered photons may lose or gain energy, and therefore may exhibit a different wavelength as compared to the light 102. The nature of the molecule (e.g., the composition of the substance 101) may influence the resulting wavelength of the scattered photons. As such, the scattered photons may be measured and, from those scattered photons, the identity of all or portions of the substance 101 may be derived. As noted above, such scattered photons may be referred to as the Raman scattering 104. Other photons, which do not gain or lose energy to the substance 101, may also be scattered, and those photons may exhibit the same or a similar wavelength as the light 102. As noted above, such scattered photons may be referred to as the Rayleigh scattering 103.

In addition to the Raman scattering 104, laser-induced fluorescence (LIF) may result from the substance 101 as a result of the light 102. At particular frequencies of light (e.g., where a particular photon matches an energy difference between two levels of all or portions of the substance 101), the substance 101 may absorb the energy of the photon and, a short time later, emit photons with energies corresponding to the energy difference between states of the substance 101. Such activity may occur in addition to the Raman scattering 104 and the Rayleigh scattering 103.

Figure 2:
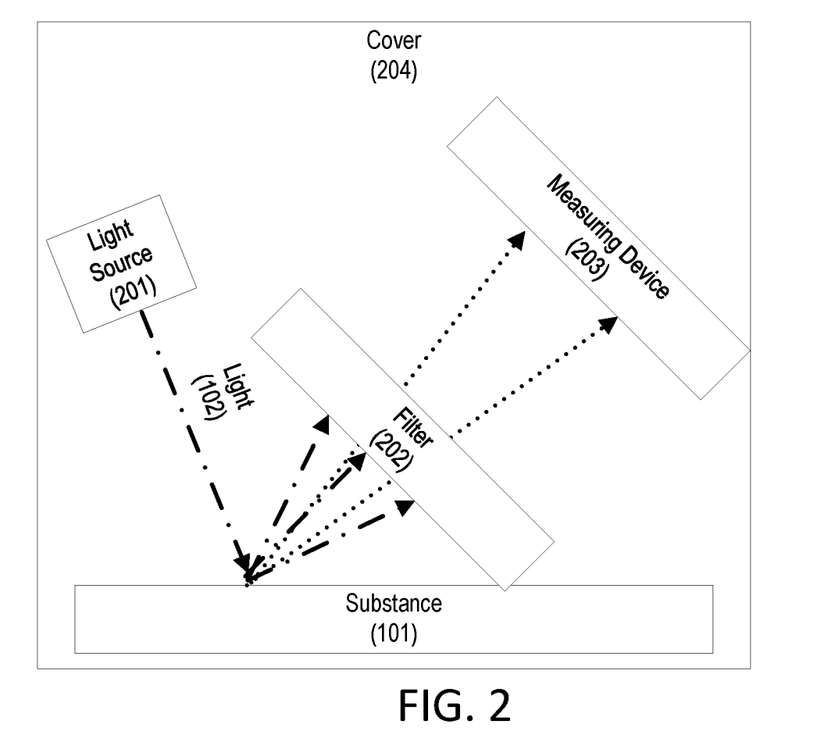
FIG. 2 shows Raman spectroscopy on a substance.

FIG. 2 shows Raman spectroscopy, which uses the Rayleigh scattering process described with regards to FIG. 1. The light 102 originates from a light source 201, which may emit the light 102 at a particular wavelength (e.g., 200 nm). For example, the light source 201 may be a laser device, and the light 102 may be a laser. The light 102 may shine on the substance 101 and, as with FIG. 1, cause both the Raman scattering 104 and the Rayleigh scattering 103. A filter 202 may be configured to prevent wavelengths of 200 nm from passing through the filter 202 in one or more embodiments, thereby preventing the Rayleigh scattering 103 from reaching a measuring device 203 but allowing photons of other wavelengths (e.g., Raman scattering) through. The filter 202 may be, for example, a band pass filter, a notch filter, an edge pass filter, or the like. The Raman scattering 104 may be permitted to pass through the filter 202 and reach the measuring device 203. The measuring device 203 may be any device configured to detect and/or measure the Raman scattering 104 and/or laser-induced fluorescence from the substance 101. Based on, e.g., the wavelength of the Raman scattering 104, the identity of the substance 101 may be derived. For example, the measuring device 203 may be communicatively coupled with a database including experimentally derived wavelengths corresponding to a plurality of different substances, such that the identity of a substance may be derived by correlating the Raman scattering 104 with one or more database entries.

The filter 202 may be configured to block the Rayleigh scattering 103 from reaching the measuring device 203, but ambient light (e.g., from the sun and/or nearby light sources) may cause the measuring device 203 to receive wavelengths of light that are not the Raman scattering 104, but which appear to be the Raman scattering 104. For example, the light source 201 may emit the light 102 at 200 nm and the filter may be configured to prevent 200 nm light from reaching the measuring device 203 such that only the Raman scattering 104 (e.g., at 300 nm) may reach the measuring device 203; however, ambient light from a nearby window with a wavelength of, e.g., 100 nm may reach the measuring device 203 and cause the measuring device 203 to make inaccurate measurements of the substance 101 (e.g., to assume that the substance 101 is scattering photons at both 300 nm and 100 nm, rather than only 300 nm). To prevent such ambient light from interfering with the measuring device 203, a cover 204 may be implemented. The cover 204 may accordingly be configured to shield any form of external radiation from reaching the measuring device 203.

In Raman spectroscopy of the type shown in FIG. 2, the cover 204 may cover and/or contain the substance 101. An operator and/or device (e.g., a lunar rover) may physically retrieve the substance and contain it within the cover 204.

Figure 3:
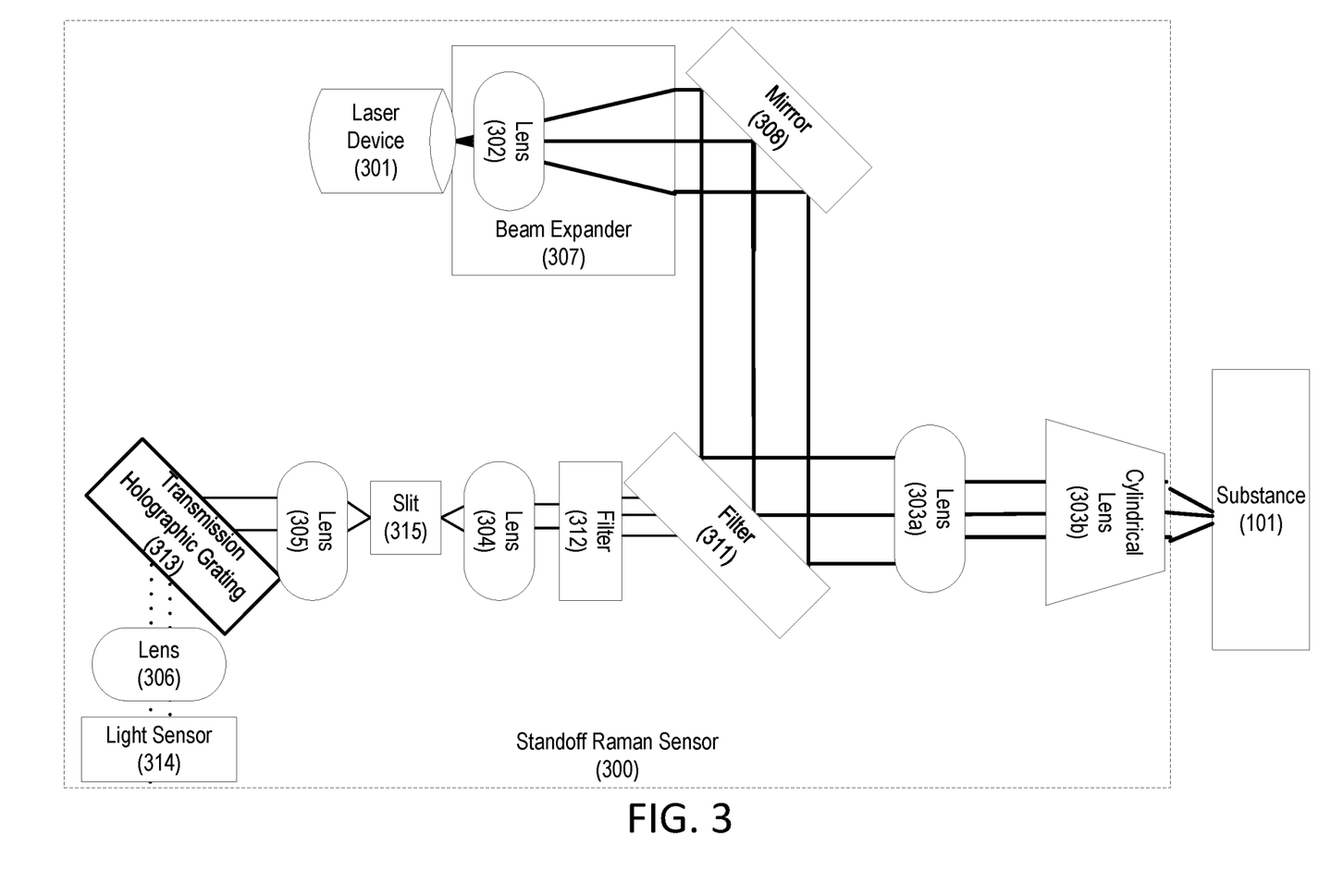
FIG. 3 shows an example stand-off ultra-compact Raman sensor (SUCR) in accordance with one or more embodiments disclosed herein.

FIG. 3 shows an example stand-off ultra-compact Raman sensor (SUCR) in accordance with one or more embodiments. The illustrated standoff Raman sensor comprises a laser device 301, lenses 302-306, a beam expander 307, mirror 308, filters 311-312, transmission holographic grating 313, light sensor 314, and slit 315. The standoff Raman sensor 300 is configured to send and receive light, e.g., via an aperture, to the substance 101.

The laser device 301 may be any device configured to transmit a laser. For example, the laser device 301 may include a laser diode. The laser may be, for example, a neodymium-doped yttrium aluminum garnet (Nd:YAG) laser. The laser device 301 may be configured to transmit a laser at one or more wavelengths (e.g., 532 nm), at one or more particular levels of energy (e.g., 0.1 mJ), and at one or more particular repetition rates (e.g., 1 kHz pulses). For example, a wavelength from a plurality of wavelengths may be selected based on a prediction of the identity of a substance. The laser device may use a Faraday isolator. The laser device may be configured to modify the wavelength, level of energy, and/or the repetition rate. For example, the wavelength, level of energy, and/or the repetition rate may all be individually modified, such as for example, based on results from previous results using the stand-off ultra-compact Raman sensor, ambient conditions, the likely identity of the substance 101 (e.g., a prediction by the operator that the substance 101 is of a type that would respond in a certain manner to a certain wavelength), and/or to achieve laser-induced fluorescence. One or more of these or other changes or alterations to the system or device may be automatically performed based on a processor processing computer-executable instructions on a computer-executable medium. As such, the system or device may operate in a different and/or more efficient manner than previously-known systems or methods.

Certain embodiments may include a beam expander, such as beam expander 307. Beam expander 307 may comprise a lens 302, which may expand the laser from the laser device 301 to create an expanded laser in certain embodiments. The lens 302 may be a negative lens, which expands the laser beam to a width (e.g., a ~34 um×5 mm rectangle) that, as reflected through the mirror 308, the filter 311, the lens 303a, and/or the cylindrical lens 303b, may be made incident on a desired quantity of the substance 101.

One or more mirrors, such as, for example, mirror 308, may receive the laser as expanded by the beam expander 307 and may reflect the beam to the filter 311. Mirrors, such as the mirror 308, may be configured to reflect all or portions of light (e.g., a laser). Though one mirror is shown as part of the standoff Raman sensor 300, more or fewer mirrors may be implemented. Additionally or alternatively, the mirror may be configured with filters, e.g., such that only light of a certain wavelength is reflected.

Illustrated filter 311 may be configured to reflect light at a first angle and permit light at other angles. The filter 311 depicted in FIG. 3 is configured to reflect light at a 45 degree angle but permit light at or near normal incidence. In this manner, the filter 311 may reflect laser wavelengths (e.g., 532 nm) incident at 45 degrees while permitting Raman-shifted wavelengths (e.g., those from the substance 101) that are not at 45 degrees. The filter 311 shown in FIG. 3 reflects light at a 45 degree angle to the lens 303a.

The filter 311 may additionally or alternatively be configured to reflect light at one or more first wavelengths and to transmit light at one or more second wavelengths different from the one or more first wavelengths. For example, the filter 311 and the filter 312 may be merged such that light is reflected if at a same or substantially similar wavelength as transmitted by the laser device 301, but may permit light if at a different wavelength. Filters (e.g., the filter 311 and the filter 312) may be configurable, such that the permitted and reflected wavelengths may be modified (e.g., based on the wavelength of the laser transmitted by the laser device 301, such that Rayleigh scattering is reflected).

The lens 303a and the cylindrical lens 303b may be configured to receive light from the filter 311 and to focus the light, e.g., to focus the laser beam from the laser device 301 on the substance 101. The lens 303a may be configured to focus the laser onto all or portions of the cylindrical lens 303b, which may further focus the laser onto a particular point of the substance 101. The lens 303b may be configured to modify the width of the laser based on, for example, the distance between the standoff Raman sensor 300 and the substance 101, the quantity of the substance that is to be tested, the properties of the substance 101 (e.g., if the substance 101 is shiny, the beam may be undesirably reflected if the beam is too wide), or the like. Modification of the width of the laser may be performed by, for example, moving the positioning of the lens 303b. For example, the lens 308 may be a cylindrical lens with a focal length of 60 mm and may be configured to focus at 6 cm to an area having a width of approximately 10 μm and having a height of approximately 5 mm. The same lenses may receive light from the substance 101 (e.g., Raman scattering, Rayleigh scattering, and/or laser-induced fluorescence) and transmit the light back to the filter 311. As the light is transmitted back to the filter 311 at an angle other than the first angle, the light is permitted through the filter 311 to the filter 312.

Filter 312 is another filter, which may be present in one or more implementations, which may be configured to further refine the angle of incidence of the light. For example, the filter 312 may be a 0-8 degree notch filter. The filter 312 may be configured to prevent transmission of light above a particular angle (e.g., eight degrees), which may refine the light transmitted to the lens 304. The filter 312 may additionally or alternatively be configured to reflect and/or otherwise prevent transmission of light having wavelengths the same or similar as that transmitted by the laser device 301.

The lens 304, the lens 305, and the slit 315 may be configured to effectuate focus, by the light sensor 314, on a target (e.g., the substance 101). The lens 304 may be, for example, a microscope objective lens, and lens 305 may be, for example, a C-mount lens. The slit 315 may be, for example, 50μm The lens 304, the lens 305, and the slit 315 may collectively comprise a lens assembly.

In certain implementations, focused light, such as for example, by a lens assembly described herein, may then continue to a diffraction grating, such as illustrated transmission holographic grating 313. The transmission holographic grating 313 may be configured to split (e.g., diffract) the light into component wavelengths. The transmission holographic grating 313 may additionally or alternatively be, for example, a ruled grating. The transmission holographic grating 313 may be used to, for example, spread light across different portions of the light sensor 314, which may better enable the light sensor 314 to detect particular wavelengths. The light may be diffracted into one or more component wavelengths and transmitted to the lens 306, which may be a C-mount lens the same as or different from the lens 305. From the lens 306, the light may be transmitted to the light sensor 314.

The light sensor 314, which may be the same or similar as the measuring device 203, may be any device configured to detect and measure light at one or more wavelengths. For example, the light sensor 314 may be an intensified charge-coupled device (ICCD) camera configured to detect signals in a particular range (e.g., from 534 nm to 700 nm). The light sensor 314 may be communicatively coupled to one or more computing devices, which may be configured to analyze the light to determine an identity of the substance 101. For example, the computing devices may comprise a spectrograph, a transmitter, and/or an image processor. The identity of the substance 101 may be determined based on a count of photons at various wavelengths and/or wave numbers, and such a count may be part of a characteristic fingerprint of a given substance. The fingerprints may be, for example, a spectrograph fingerprints, such as a series of peaks and valleys in a spectrograph associated with one or more substances. That characteristic fingerprint may be viewed using the spectrograph. For example, naphthalene may exhibit sharp and narrow spikes at 761, 1018, 1382, 1465, and 1575 $cm^{-1}$ in the low frequency regions and 3057 $cm^{-1}$ in high frequency regions.

The light sensor 314 may be configured to use the properties of the laser (e.g., as transmitted from the laser device 301) to isolate the Raman scattering 104 from ambient light. For example, the laser device 301 may be configured to produce a 532 nm, 0.1 mJ laser in 1 kHz pulses. The properties of the laser (e.g., the pulse frequency) may be used to identify light on the light sensor 314 that is likely the Raman scattering 104 (and not the Raman scattering 104). For example, if the laser is pulsed at a slow frequency but a continual source of light reaches the light sensor 314, it is possible that the continual source of light is environmental, rather than a form of the Raman scattering 104. As another example, if the laser device 301 is configured to vary the wavelength of the laser and a source of light at the same frequency is detected by the light sensor 314 regardless of wavelength, it is possible that the source of light is environmental, rather than a form of the Raman scattering 104.

The light sensor 314 may additionally or alternatively be configured to detect laser-induced fluorescence in addition to the Raman scattering 104. Different substances may exhibit different forms of the Raman scattering 104 and/or laser-induced fluorescence. For example, whereas most substances may exhibit some form of scattering (and thus the Raman scattering 104 may be common), relatively fewer substances may exhibit laser-induced fluorescence at a particular wavelength. Such laser-induced fluorescence may exhibit a different type of light (e.g., a different wavelength) as compared to the Raman scattering 104. As such, the presence of laser-induced fluorescence may be part of the fingerprint of a particular substance, and/or may be used to confirm correct identification of a given sub stance.

The distance between the standoff Raman sensor 300 and the substance 101 may be varied. For example, the distance between the cylindrical lens 303b and the substance 101 may be varied from 2 to 20 cm, and the lens 303b may be reconfigured to accommodate for the distance. Additionally or alternatively, the lenses (e.g., lens 303a, lens 304, and/or lens 305) and/or the beam expander 307 may be reconfigured, e.g., via line scanning, to maintain a particular target area on the substance 101 (e.g., a 5 mm×5 mm area). For example, the standoff Raman sensor 300 may be hand-held, such that a user may place it at a plurality of varying distances from the substance 101, and the standoff Raman sensor 300 may be configured to adjust its focus (e.g., using the lens 303a, the lens 303b, the lens 304, the lens 305, and the beam expander 307) to accommodate for the varying distances. As another example, the standoff Raman sensor 300 may be mounted to a planetary rover, such that the rover may be of varying distances from a substance of interest.

By way of illustration, in FIG. 3, the laser device 301 may be a 532 nm laser. The laser may be expanded and collimated to a beam diameter of 5 mm by the lens 302, which may be a negative expanding lens, and by the lens 303a, which may be a positive collimating lens. The collimated laser beam may be brought to a linear focus that is 5 mm height by 10 µm width by the cylindrical lens 303b, which may have a 60 mm focal length. The beam may scan across the cylindrical lens 303b to scan the beam across the substance 101. The filter 311, which may be a notched reflecting filter for 532 nm designed for an angle of incidence of 45 degrees, may be placed between the lens 302, which may be an expanding lens, and the lens 303a and the cylindrical lens 303b. The filter 311 may reflect the expanded laser by 90 degrees. In this manner, the filter 311 may reflect the 532 nm light from the substance 101, preventing it from entering the spectrometer. Raman scattering from the substance 101 may propagate back through the cylindrical lens 303b, the lens 303a, the filter 311, and the filter 312, which may be a 0° reflecting notch filter, before it is finally collected by the lens 304, which may be a spectrometer objective lens with an achromatic doublet, and focused onto the slit 315. The lens 305, which may be a 50 mm focal length (FL) double Gauss C-mount camera lens, may collimate the light from the slit 315 to the transmission holographic grating 313. The transmission holographic grating 313 may be designed for use at 532 nm and may comprise two gratings together, such that one of the two gratings disperses the spectrum from 535 nm to 613 nm, and the other grating disperses the spectrum from 613 nm to 699 nm. The two gratings may be angled with respect to each other so that the two spectra are focused on the image plane of the light sensor 314, which may be an ICCD camera, as two separate linear spectra, one above the other. The lens 306, which may be a focusing lens, may be another 50 mm FL double Gauss C-Mount camera lens.

By way of another illustration, substance 101 shown in FIG. 3 may be a biofluid, tissue, and/or cells (e.g., skin) which may be potentially cancerous. Raman bands for breast cancer biomarkers may be observed in the 300-1800 $cm^{-1}$ region. The standoff Raman sensor 300 may comprise a hand-held device connected to a computing device with a spectrograph configured in a range which comprises the 300-1800 $cm^{-1}$ region. The standoff Raman sensor 300 may be configured to shine a laser at a particular wavelength (e.g., 500 nm) at the potentially cancerous tissue. The laser may cause Raman scattering from the tissue, which may be passed through the cylindrical lens 303b and the lens 303a, filtered through the filter 311, the filter 312, and the transmission holographic grating 313, and passed through the lens 304, the lens 304, the slit 315, the lens 305, and the lens 306 to the light sensor 314. The filters may be modified with respect to the laser wavelength, e.g., in 100 nm increments. The light sensor 314 may be configured to analyze the Raman scattering from the tissue and compare it with fingerprints of cancerous and non-cancerous tissue. The results may thereby suggest the presence and/or absence of cancer in one or more regions.

The substance 101 shown in FIG. 3 may be unknown matter on a planetary surface. The substance 101 may thus cause an unknown type of Raman scattering. The standoff Raman sensor 300 may be coupled to a rover, which may be configured to point the standoff Raman sensor at targets of interest. The rover may be configured with a sensor configured to measure distance, such that the standoff Raman sensor 300 may be reconfigured to focus on the substance 101. The standoff Raman sensor 300 may be configured to shine a laser at one or more wavelengths (e.g., a sweep from 100-1000 nm in 100 nm increments) at the substance 101. The laser may cause Raman scattering from the substance 101, which may be transmitted through the cylindrical lens 303b and the lens 303a, filtered through the filter 311, the filter 312, and passed through the lens 304, the slit 315, and the lens 305, filtered through the transmission holographic grating 313, and passed through the lens 306 to the light sensor 314. The light sensor 314 may be configured to analyze the Raman scattering from the substance 101 and compare it with fingerprints of known substances. Based on the analysis, a likely identity of the substance 101 may be determined.

The configuration of elements shown in FIG. 3 is exemplary. The configuration of any element (e.g., the filter 311, the lens 303a, and/or the cylindrical lens 303b) may be the same or different based on, for example, the desired shape and size of the standoff Raman sensor 300. One or more elements may be added, duplicated, merged, or removed. For example, the filter 312 may be removed, or may be merged with the filter 311. The lens 303a, 303b, 304, 305, and 306, the slit 315, and/or the transmission holographic grating 313 may be removed, and the light sensor 314 may be configured to perform similar functions (e.g., in software). As another example, the light sensor 314 may be configured to retrieve raw (e.g., unfiltered) photons via the filter 312 and/or the filter 311 and use software executing on a computing device to isolate information (e.g., wavelengths) of interest.

Figure 4:
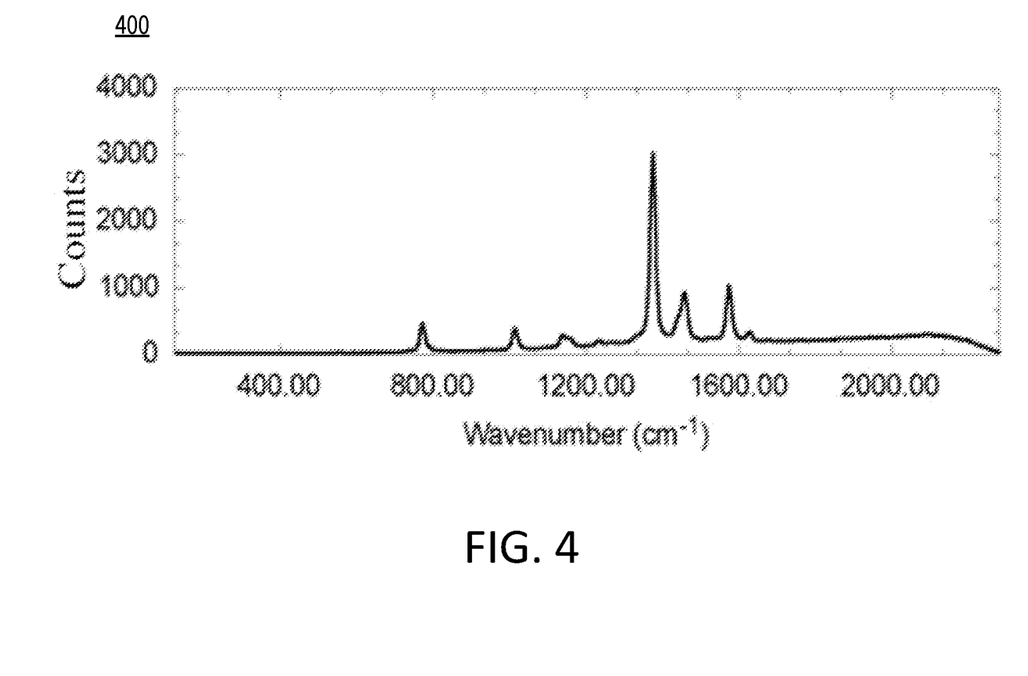
FIG. 4 shows a spectrograph output obtained in accordance with the one or more embodiments disclosed herein.

FIG. 4 shows a spectrograph output 400 which may be produced via the light sensor 314 of the standoff Raman sensor 300. The Y axis of the spectrograph output 400 is a count of photons received, e.g., by the light sensor 314. The X axis of the spectrograph output 400 corresponds to the Raman shift, wave number, in units of $cm^{-1}$. The spectrograph output 400 is for naphthalene. As shown in the graph, naphthalene exhibits sharp and narrow Raman fingerprints at 761, 1018, 1382, 1465, and 1575 $cm^{-1}$. Though summarized as a chart in FIG. 4, output from the light sensor 314 may be in any format. For example, the output may be a series of values (e.g. a list of wave numbers for received photons) among others which may provide the fingerprint of a sample.

A computing device, e.g., one or more components that collectively comprise a processor and a non-transitory computer-readable medium comprising a computer-executable instructions that when executed by the processor (and/or another processor) perform one or more actions, may be implemented or configurable, for example, to control laser and/or focusing elements, to receive data, such as that depicted in the chart in FIG. 4, and/or analyze the data to determine an identity of the substance 101. The computing device may compare received information corresponding to the substance 101 (e.g., the light sensor 314) and compare it to known information about substances (e.g., a plurality of spectrograph outputs for other substances) to determine the identity of the substance 101. For example, if the standoff Raman sensor 300 scanned a substance which exhibited sharp and narrow Raman fingerprints around 760, 1010, 1380, 1460, and 1580 $cm^{-1}$, the computing device may execute instructions that when executed are configured to recognize such "fingerprints" as roughly similar to that of naphthalene.

Although examples are described above, features and/or steps of those examples may be combined, divided, omitted, rearranged, revised, and/or augmented in any manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A standoff Raman sensor comprising:
a laser device, configured to transmit a laser beam at a first wavelength;
a beam expander, configured to expand the laser beam to a predetermined size;
a first lens, configured to collimate the expanded laser beam;
a cylindrical lens, configured to modify the collimated expanded laser beam to a line laser beam and to focus the line laser beam for incidence on a substance, wherein the cylindrical lens is positioned between the first lens and the substance;
a filter, wherein the line laser beam is reflected by the filter, wherein Raman scattering from the substance is permitted to pass through the filter, wherein the Raman scattering is one or more second wavelengths different from the first wavelength, and wherein the Raman scattering is associated with the incidence of the line laser beam on the substance;
a second lens, configured to receive Raman scattering via the filter and transmit it to a holographic grating, wherein the second lens is configured to focus the Raman scattering on the holographic grating; and
a light sensor, configured to receive the Raman scattering via the holographic grating, wherein the light sensor is an intensified charge-coupled device (ICCD) camera.

2. The standoff Raman sensor of claim 1, wherein the laser device includes a switch configured to control and pulse the laser beam, and wherein the light sensor is configured to use a frequency of the laser beam to isolate a Raman signal from ambient radiation.

3. The standoff Raman sensor of claim 1, wherein the predetermined size is based on a distance between the cylindrical lens and the substance.

4. The standoff Raman sensor of claim 1, wherein the first wavelength is selected from a plurality of wavelengths based on a prediction of an identity of the substance.

5. The standoff Raman sensor of claim 1, wherein the standoff Raman sensor does not shield the substance from ambient radiation.

6. The standoff Raman sensor of claim 1, wherein the light sensor is further configured to receive laser-induced fluorescence from the substance.

7. The standoff Raman sensor of claim 1, wherein a distance between the cylindrical lens and the substance has a predetermined focal length.

8. The standoff Raman sensor of claim 1, wherein the light sensor is communicatively coupled to a computing device having a processor and a non-transitory computer-readable medium having computer-executable instructions that when executed by the processor, perform at least:
receive from the light sensor, information corresponding to the Raman scattering; and
compare the information from the light sensor to one or more spectrograph fingerprints associated with a plurality of substances to determine an identity of the substance.

9. A method comprising:
- emitting, using a laser device, a laser beam at a first wavelength;
- expanding, using a beam expander, the laser beam to a predetermined size;
- collimating, using a first lens, the expanded laser beam;
- modifying, using a cylindrical lens, the collimated expanded laser beam to a line laser beam;
- focusing, using the cylindrical lens, the line laser beam for incidence on a substance;
- reflecting, using a filter, the focused line laser beam;
- passing, using the filter, Raman scattering from the substance onto a second lens, wherein the Raman scattering is one or more second wavelengths different from the first wavelength, and wherein the Raman scattering is associated with the incidence of the line laser beam on the substance;
- focusing, using the second lens, the Raman scattering received via the filter onto a holographic grating; and
- receiving, using a light sensor and via the second lens, the Raman scattering, wherein the light sensor is an intensified charge-coupled device (ICCD) camera.

10. The method of claim 9, wherein emitting the laser beam includes using a switch on the laser device to control and pulse the laser beam, and wherein the light sensor is configured to use a frequency of the laser beam to isolate a Raman signal from ambient radiation.

11. The method of claim 9, wherein focusing the line laser beam for incidence on a substance includes modifying, using the cylindrical lens, a laser beam width.

12. The method of claim 9, wherein the first wavelength is selected from a plurality of wavelengths based on a prediction of an identity of the substance.

13. The method of claim 9, wherein ambient radiation is permitted to encounter the substance.

14. The method of claim 9, wherein the light sensor is further configured to receive laser-induced fluorescence from the substance.

15. The method of claim 9, wherein a distance between the cylindrical lens and the substance has a predetermined focal length.

16. A system comprising:
- a standoff Raman sensor, configured to:
  - emit, using a laser device, a laser beam at a first wavelength;
  - expand, using a beam expander, the laser beam to a predetermined size;
  - collimate, using a first lens, the expanded laser beam;
  - modifying, using a cylindrical lens, the collimated expanded laser beam to a line laser beam;
  - focus, using the cylindrical lens, the line laser beam for incidence on a substance, wherein the cylindrical lens is positioned between the first lens and the substance;
  - reflect, using a filter, the focused line laser beam;
  - pass, using the filter, Raman scattering from the substance onto a second lens, wherein the Raman scattering is one or more second wavelengths different from the first wavelength, and wherein the Raman scattering is associated with the incidence of the line laser beam on the substance;
  - focus, using the second lens, the Raman scattering received via the filter onto a holographic grating; and
  - receive, using a light sensor and via the second lens, the Raman scattering, wherein the light sensor is an intensified charge-coupled device (ICCD) camera;
- and a computing device, configured to:
  - receive, from the light sensor, information corresponding to the Raman scattering; and
  - determine, based on the information, an identity of the substance.

17. The system of claim 16, wherein the laser device includes a switch configured to control and pulse the laser beam, and wherein the light sensor is configured to use a frequency of the laser beam to isolate a Raman signal from ambient radiation.

18. The system of claim 16, wherein focusing the line laser beam for incidence on the substance includes modifying, using the cylindrical lens, a laser beam width.

19. The system of claim 16, wherein the first wavelength is selected from a plurality of wavelengths based on a prediction of the identity of the substance.

20. The system of claim 16, wherein the system does not shield the substance from ambient radiation.

* * * * *

UNITED STATES PATENT AND TRADEMARK OFFICE
CERTIFICATE OF CORRECTION

PATENT NO. : 11,175,232 B2
APPLICATION NO. : 16/225786
DATED : November 16, 2021
INVENTOR(S) : M. Nurul Abedin et al.

Page 1 of 1

It is certified that error appears in the above-identified patent and that said Letters Patent is hereby corrected as shown below:

On the Title Page

In the Inventors, item (72), correct the spelling of the first named inventor to "M. Nurul Abedin"

Signed and Sealed this
Twelfth Day of April, 2022

Drew Hirshfeld
*Performing the Functions and Duties of the
Under Secretary of Commerce for Intellectual Property and
Director of the United States Patent and Trademark Office*